A. J. SANFORD.
UNIVERSAL JOINT.
APPLICATION FILED JAN. 20, 1913.

1,167,599.

Patented Jan. 11, 1916.

UNITED STATES PATENT OFFICE.

ANDREW J. SANFORD, OF NEWARK, OHIO, ASSIGNOR TO A. H. HEISEY & CO., OF NEWARK, OHIO.

UNIVERSAL JOINT.

1,167,599.  Specification of Letters Patent.  Patented Jan. 11, 1916.

Application filed January 20, 1913. Serial No. 743,096.

*To all whom it may concern:*

Be it known that I, ANDREW J. SANFORD, a citizen of the United States, and resident of Newark, in the county of Licking and State of Ohio, have invented a new and useful Improvement in Universal Joints; and I do hereby declare the following to be a full, clear, and exact description thereof.

My invention relates to an improved universal joint construction, and is particularly concerned with a joint of this character in which provision is made for varying the friction between the members of the joint whereby the parts connected by the joint may be moved to and held in different relative positions by said friction action.

A further object is to provide means for locking the adjusting means in any given position of adjustment.

A further object is to provide a simple, economical and compact construction and one having a pleasingly ornamental appearance.

With these objects in view, the invention consists in a construction and arrangement of parts, a preferred embodiment of which is illustrated in the accompanying drawing, in which—

Figure 1:
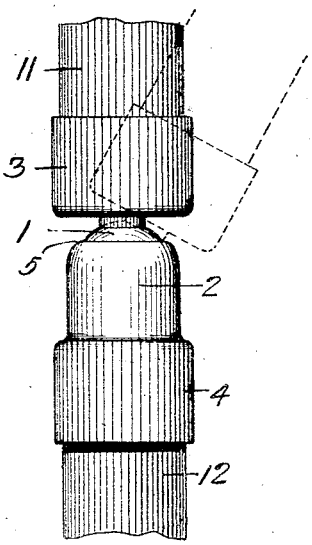
Figure 2:
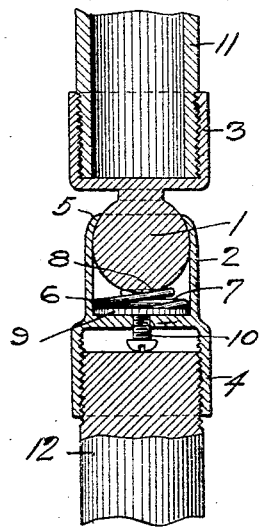

Figure 1 is a view in elevation of the joint construction with a variation in the relative position of the parts indicated in dotted outline. Fig. 2 is a longitudinal sectional view of the parts illustrated in Fig. 1.

In the embodiment of the invention herein selected for illustration, 1 indicates the ball member of the joint, 2 the socket member. The ball member is preferably formed integral with the interiorly threaded socket piece 3 and the socket member with an interiorly threaded socket piece 4. These parts may be formed in any desired and practical manner. The joint socket member 2 is in the form of a short sleeve, the end of which after the ball member has been inserted therein is spun over as at 5 to maintain the connection of the parts. Within the socket member 2 is mounted a short helical spring 6 having one helix 7 thereof of a diameter substantially equal to the interior diameter of the socket member 2 and having another helix 8 of considerably less diameter and adapted to bear against the ball member 1. Interposed between the spring and the bottom of the socket member 2 is an adjusting plate 9 which may be adjusted by means of a screw 10 passing through the bottom of the socket member 2.

The socket pieces 3 and 4 are adapted to receive the threaded standards 11 and 12 of the parts to be connected by the joint, as for example, a display shelf or bracket and its pedestal. It is, of course, immaterial to which of the parts the respective members of the joint are connected, but as here shown, I may assume that the standard 12 is a pedestal standard, which may be a solid shaft as of glass, or other suitable material, or may be a hollow shaft as in the case of the standard 11. The adjusting screw 10 is, of course, to be manipulated before the socket piece 4 is attached to its standard, although it is within the scope of the invention that access may be had to the screw through an opening in the side of the socket piece 4, if desired. In either event, the screw after being turned to the desired position of adjustment may be locked in that position, as for example by screwing home the socket piece 4 on its standard 12 until the end of the standard bears against the screw, thus holding the same against accidental loosening, or the tension of the spring may be made stronger so that the socket may be moved and still afford friction enough to prevent accidental movement thereof, thus holding the same against accidental loosening. While I have herein described a particular embodiment of my invention, it is to be understood that the same may be altered in details and arrangement of parts within the scope of the appended claim.

What I claim is:

A universal joint construction comprising a standard, an adjustable arm mounted thereon, and a universal joint for said arm, said joint comprising a socket member screwed to the standard, a ball member screwed to said arm, a spring interposed between the base of said socket member and said ball member, and a tension adjusting screw in the base of said socket member adapted to regulate the tension of said spring and adapted to be engaged by the standard to hold the screw in adjusted position.

In testimony whereof, I the said ANDREW J. SANFORD have hereunto set my hand.

ANDREW J. SANFORD.

Witnesses:
MAUDE BETTS,
JOHN MARTIN.